(12) United States Patent
Ferrer Vidal

(10) Patent No.: US 10,638,728 B2
(45) Date of Patent: May 5, 2020

(54) DEVICE AND CORRESPONDING METHOD FOR PRODUCING HONEYCOMBS FOR APICULTURE

(71) Applicant: BREAT, S.L., Gava (Barcelona) (ES)

(72) Inventor: Carlos Ferrer Vidal, Barcelona (ES)

(73) Assignee: BREAT, S.L., Gava (Barcelona) (ES)

( * ) Notice: Subject to any disclaimer, the term of this patent is extended or adjusted under 35 U.S.C. 154(b) by 274 days.

(21) Appl. No.: 15/566,193

(22) PCT Filed: Feb. 29, 2016

(86) PCT No.: PCT/ES2016/070132
§ 371 (c)(1),
(2) Date: Oct. 12, 2017

(87) PCT Pub. No.: WO2016/177918
PCT Pub. Date: Nov. 10, 2016

(65) Prior Publication Data
US 2018/0116181 A1    May 3, 2018

(30) Foreign Application Priority Data
May 5, 2015  (ES) .................................. 201530609

(51) Int. Cl.
*A01K 47/04*   (2006.01)
*B29D 99/00*   (2010.01)
(Continued)

(52) U.S. Cl.
CPC .......... *A01K 47/04* (2013.01); *B29D 99/0089* (2013.01); *B29C 41/28* (2013.01);
(Continued)

(58) Field of Classification Search
CPC ..... B29C 48/11; B29C 66/7254; B29C 41/28; B29C 43/48; B29C 41/44; B29K 2091/00;
(Continued)

(56) References Cited

U.S. PATENT DOCUMENTS 1,751,430 A * 3/1930 Thomson ................ B28B 1/004
264/162
6,340,324 B1 * 1/2002 Ferrer Vidal .......... A01K 47/04
449/2

(Continued)

FOREIGN PATENT DOCUMENTS

EP    0893234 A2   1/1999
EP    1072187 A1   1/2001
EP    1982586 A2   10/2008

OTHER PUBLICATIONS

International Search Report, dated Jun. 1, 2016, in International Application No. PCT/ES2016/070132.

*Primary Examiner* — Jeffrey M Wollschlager
(74) *Attorney, Agent, or Firm* — Knobbe, Martens, Olson & Bear, LLP

(57) ABSTRACT

A device to form a honeycomb has an upper continuous belt and a lower continuous belt disposed in parallel and carrying opposing cores. The belts act on liquid wax which is injected into an inlet of the device, with both belts moving in opposition. The inlet has in succession: a scraping zone disposed straight with respect to the upper belt; a zone for opening the cores, which has a certain curvature designed to receive a first injection of wax; and a third straight zone for sealing and expelling any excess wax. At an exit of the device, the longest length of the upper belt has multiple groups of magnetic and non-magnetic rollers for a local curving of the belt to progressively release the honeycomb.

11 Claims, 5 Drawing Sheets

(51) Int. Cl.
  *B29C 41/28* (2006.01)
  *B29C 65/00* (2006.01)
  *B29C 48/11* (2019.01)
  *B29C 41/44* (2006.01)
  *B29C 43/48* (2006.01)
  *B29D 24/00* (2006.01)
  *B29K 91/00* (2006.01)

(52) U.S. Cl.
  CPC .............. *B29C 41/44* (2013.01); *B29C 43/48* (2013.01); *B29C 48/11* (2019.02); *B29C 66/7254* (2013.01); *B29D 24/005* (2013.01); *B29K 2091/00* (2013.01)

(58) Field of Classification Search
  CPC .. B29D 24/005; B29D 99/0089; A01K 47/04; A01K 47/00
  See application file for complete search history.

(56) References Cited

U.S. PATENT DOCUMENTS

| | | | | |
|---|---|---|---|---|
| 6,358,340 | B2* | 3/2002 | Ferrer Vidal | A01K 47/04 156/245 |
| 7,897,091 | B2* | 3/2011 | Vidal | A01K 47/04 264/313 |
| 2001/0002611 | A1* | 6/2001 | Ferrer Vidal | A01K 47/04 156/245 |
| 2010/0102486 | A1* | 4/2010 | Vidal | A01K 47/04 264/405 |

* cited by examiner

DEVICE AND CORRESPONDING METHOD FOR PRODUCING HONEYCOMBS FOR APICULTURE

CROSS REFERENCE TO RELATED APPLICATIONS

This application is the U.S. National Phase Application under 35 U.S.C. § 371 of International Application No. PCT/ES2016/070132, filed Feb. 29, 2016, designating the U.S. and published as WO 2016/177918 A1 on Nov. 10, 2016, which claims the benefit of Spanish Patent Application No. P 201530609, filed May 5, 2015. Any and all applications for which a foreign or a domestic priority is claimed is/are identified in the Application Data Sheet filed herewith and is/are hereby incorporated by reference in their entirety under 37 C.F.R. § 1.57.

FIELD

The present invention relates to a device and corresponding method for producing honeycombs for apiculture by moulding a continuous honeycomb element from which the honeycombs for installation in the beehives are individually cut.

SUMMARY

The invention relates in general to the production of honeycombs for apiculture by moulding a wax mass and combining two moulding strips arranged parallel and opposite each other, which clasp the wax mass in a liquid state, said wax being moulded by projections in the form of moulding cores of which the shape matches that of the cavities of the honeycomb and which on cooling travel in a continuous movement from the wax input end to the moulded honeycomb output end, allowing honeycombs for apiculture to be produced quickly and easily, which results in a favourable production price.

BRIEF DESCRIPTION OF THE DRAWINGS

For a better understanding, the accompanying drawings provide an illustrative and non-limiting example of a preferred embodiment of the present invention.

DETAILED DESCRIPTION

Figure 1:
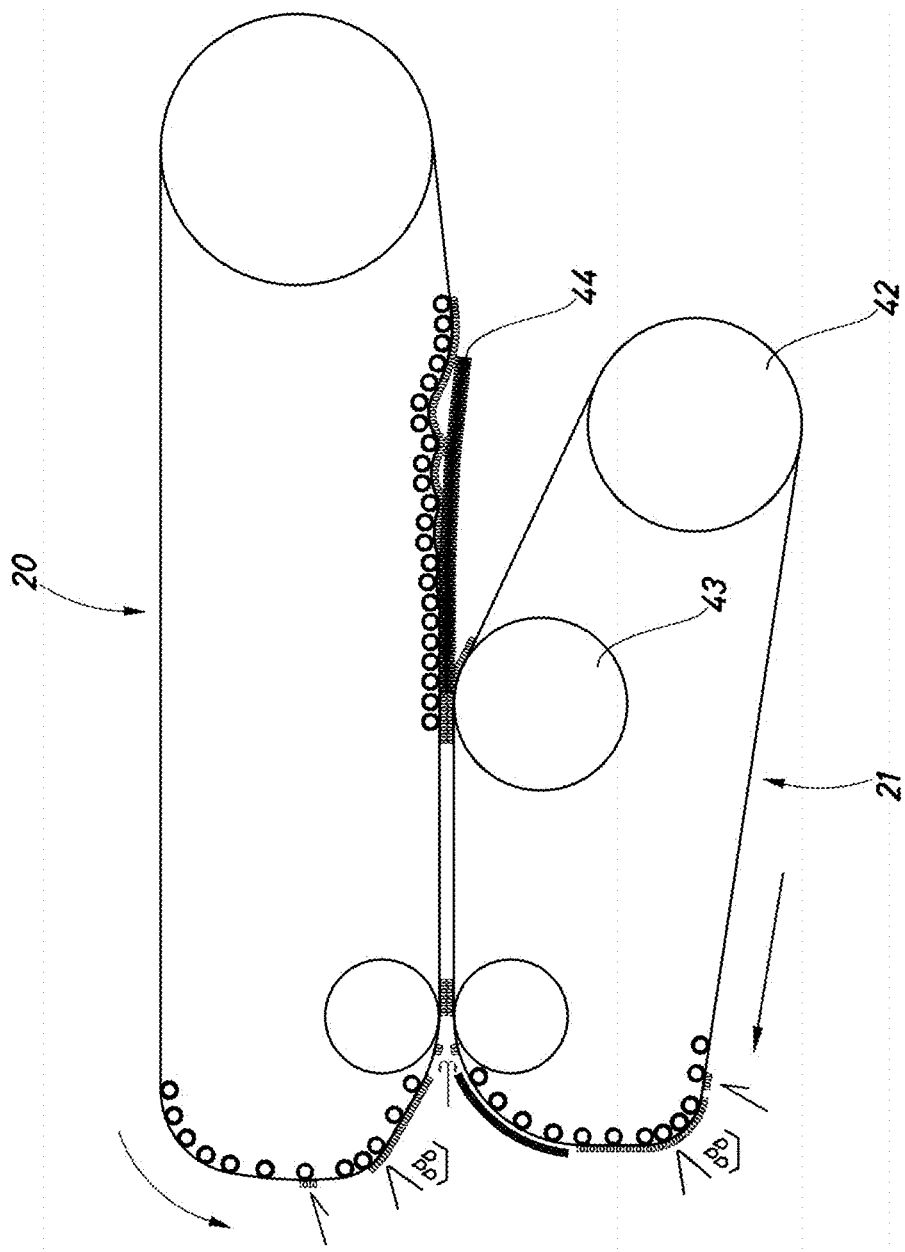
FIG. 1 shows a diagrammatic view of the entire device according to the present invention.

The inventor of the present method and device has produced various other inventions relating to the production of honeycombs for apiculture including Spanish patents no. 9600019, 9701564 and 200700845, and Spanish patent of addition no. 9801156.

In Spanish patent no. 200700845 the inventor discloses the separation of the strips for moulding the honeycombs by means of combining sets of excited electromagnets of a determined form and the metal strip and iron powder incorporated in the cores, thus allowing transversal movements of the strips to be achieved, which allows easy demoulding of honeycombs with very thin walls.

The method according to the above-mentioned Spanish patent, although satisfactorily solving the problems associated with the production and demoulding of honeycombs with very thin walls, had some drawbacks, such as the relative slowness of the process, the possible contamination by the iron powder, the difficulty of producing effective magnetic pulses, because the strip is separated at the beginning and requires a very powerful field, and the loss of magnetic energy due to the dispersion of the field and the relative fragility of the honeycombs produced.

The object of the present invention is to overcome the above-mentioned drawbacks by means of a novel method and device for producing honeycombs for use in apiculture.

To overcome the above-mentioned drawbacks, the inventor has developed a novel method based on a first phase in which wax is supplied to the honeycomb forming device and a second phase in which after completing the moulding and cooling process, the lower strip is separated from the set of two continuous strips or belts carrying the moulding cores and then separating the upper strip, in such a way that in the zone corresponding to the portion in which the wax has already solidified enough to separate said wax from the cores, said upper strip is subjected to successive forming of curved zones with variable radii of curvature and variable length of the curved sector in order gradually to remove and partly eject the newly-moulded honeycombs from the respective cores, so that honeycombs can be produced with very thin walls and the honeycomb is separated from the moulding cores without breaks occurring in the thin walls of the honeycombs.

The formation of the successive curved zones according to the method of the present invention, may take place preferably by means of successive series of rollers which guide the upper moulding strip or belt along the upper portion thereof, that is, the outer portion so that, by their position said rollers determine the curved zones with the required radii and the most appropriate length of the arched zone to achieve the gradual separation of the moulding strips and the moulded honeycombs. Some of the rollers will have the characteristics of permanent magnets, which will combine with the metal sheet behind the moulding strip to produce the desired separation, thereby determining the curvature of the upper moulding strip in the successive curved zones.

Preferably, the curvature of the successive demoulding zones will be gradual, that is, from a first zone with a gentle curvature, that is, with a considerable radius of curvature, it will pass to another zone of greater curvature, that is, with a much smaller radius of curvature and finally to another zone or zones with more pronounced curvatures, thus together achieving the gradual separation of the moulding strip from the moulded honeycomb.

In a preferred embodiment, the device may have various successive zones of curvature in the first of which a single magnetic roller will produce the partial separation of the moulding cores from the moulded honeycomb, said rollers being complemented by two non-magnetic rollers, the separation in height of the magnetic roller from the non-magnetic rollers being that required to determine the first zone of curvature. Next, other zones of curvature will be arranged with two or more magnetic rollers and intermediate non-magnetic rollers positioned with the necessary separation and height to produce the different successive curvatures needed to carry out the method according to the invention.

The initial wax-feeding phase takes place at the input portion of the device where the two strips carrying the cores for forming the wax honeycomb meet. Accordingly, a series of successive similar operations is carried out on the two forming strips, which basically comprise an initial step of scraping the cores of the forming strips, then opening the cores for injecting the wax, followed by the closure and ejection of the excess wax and cooling to a paste-like consistency, after which the strips are positioned opposite each other thus forming the honeycomb with the previously injected wax and with the liquid wax which is injected at the moment when the two strips coincide.

Next, to appreciate the innovative features of the present invention more clearly a short survey of the most characteristic phases of the invention will be given, showing the advantages achieved thereby compared with the previously mentioned methods of the prior art based on two metal strips with hexagonal silicone cores with iron powder which basically have significant drawbacks: firstly high energy consumption by the electromagnets and the process of cooling the previously heated strip, secondly lower production due to the slowness of the cooling process and thirdly contamination of the wax with iron powder which migrates from the silicone to the wax.

To summarise, the present invention, as will be explained in detail below, provides a threefold improvement to the prior art through increased production speed, reduced energy consumption and not using iron powder in order to eliminate contamination.

It will be observed that in the prior art in order to introduce the liquid wax between the cores, the wax and the silicone strip had to be warmed to facilitate the circulation of the wax between the cores which are separated a small distance, some tenths of a millimetre, thus preventing said wax from solidifying before occupying all the space. Heating the strip is slow and takes place in a warm atmosphere, and the subsequent cooling in a cold atmosphere is also slow due to the low conductivity of the silicone. In the present invention, because the silicone strips are not heated and the entire system is kept at a constant ambient temperature, the liquid wax is at only a slightly higher temperature than its melting point, there is far less cooling and the heating time is unnecessary, all of which represents an energy saving and greater production speed.

The strip separation speed in the prior art is also limited because handling the magnetic powder and curving the metal band require a minimum amount of time. Re-establishing the magnetic field and the subsequent bending of the metal strip are not instantaneous. If the pulse frequency is increased, those pulses are transformed into vibrations of the strip without curving said strip and the separation of the wax from the strip ceases. At the same time, establishing magnetic pulses has a high energy cost given the consumption needed to establish a magnetic field powerful enough to attract a separated apart strip and the electromagnet cooling process is necessary, as iron dust has to be included in the silicone cores.

According to the invention, liquid wax is injected at low temperature separately at each of the cold strips in an upward direction to avoid splashes which would solidify on contact with the cold silicone strips. The wax enters by high-speed projection against the previously separated but unheated cores. Once filled, said cores are immediately closed before the wax solidifies in order to expel the excess wax. This is an important effect because if the wax solidifies before the cores are closed said wax will be compressed, increasing wax consumption and causing the method of separating the honeycombs from the strips to cease due to the change in resilience of the silicone, as when compressed said silicone loses resilience. The opening and very rapid closing of the cores is achieved by rolling the tightened metal strip round magnetic and non-magnetic rollers which produces a curving of the strip in order to open the cores and positions the strip straight in order to close them. Next, with the wax solidified but warm, the two strips are placed opposite each other by rotation and joined by liquid wax to form the honeycomb. Joining is possible because the wax solidifies but it is in a sufficiently warm and paste-like state to support the rotation of the strip without breaks and for the circulation of the warm liquid wax to melt a boundary layer on each side. To achieve this, a thermal blanket is arranged on the lower strip in its travels to the point of tangency. All this speeds up the cooling process, as there is less heat to dissipate. Since silicone is a thermal insulator, there is a significant difference in cooling time and heating is unnecessary. In the present invention, compared with the prior art temperature has been substituted for the speed of the wax and the opening of the cores. Cooling is therefore faster and less expensive as the entire system is in a single cool environment.

The present invention also provides improvements in the separation of the continuous structure honeycomb. Once the wax is cool enough and has sufficient cohesion, the honeycomb is separated from the silicone strips carrying the cores.

First, the lower strip is separated by rotation thereof around a drum while keeping the upper strip flat in order to hold the honeycomb as air is prevented from entering between the honeycomb and said upper strip. To that end, magnetic rollers are used to prevent deformation of the upper strip and to keep the strip flat. The upper strip keeps the axes of the cores parallel and on the lower strip the cores are separated so that atmospheric pressure can act and they can be separated. The pressure of the atmosphere allows the honeycomb to be kept adhering to the upper strip.

Next, the honeycomb is separated from the upper strip. Rotation of the strip cannot be used for this purpose, as there is no means of holding the honeycomb straight. The system must be self-ejecting so that the separation is achieved by small concave undulations of the upper strip achieved using permanently magnetised rollers. The cores do not separate from each other in these undulations. The cores, which previously followed a straight line, are withdrawn in a vertical direction by just a few millimetres while remaining parallel which allows minimum friction between wax and silicone, said silicone becoming thinner with the lower tension. The rigidity of the wax holds the honeycomb in a straight line provided the wax is not compressed. After this movement, the core returns to the previous vertical position but farther back relative to the corresponding cell. The honeycomb has travelled straight and the cores a little more due to the concave trajectory and the increased cross section in the event of friction and prevents the core from returning into the cell so that the honeycomb is held a few tenths of a millimetre away from the cores at the end of the concave undulation. This action is repeated in the following concave undulations, adding more separation until separation is complete. The following undulations are greater because there is no adhesion between wax and silicone. At the end of the undulations and simply to ensure the distancing of the honeycomb from the strip, there is a permanent opening of the cores by means of a greater convex curvature. This process takes place on the upper strip because the weight of the honeycomb assists the entire process and subsequent transfer outside the system. The system of magnetic rollers has no speed limit as the metal strip always adheres thereto and the time needed to establish the magnetic field and effect the bending is non-existent. Neither is there any electrical consumption because the rollers are permanent magnets and do not consume electricity, nor do they need to be cooled as they are not heated and, being in permanent contact, iron dust is not required to increase the attraction of the electromagnets.

Figure 2:
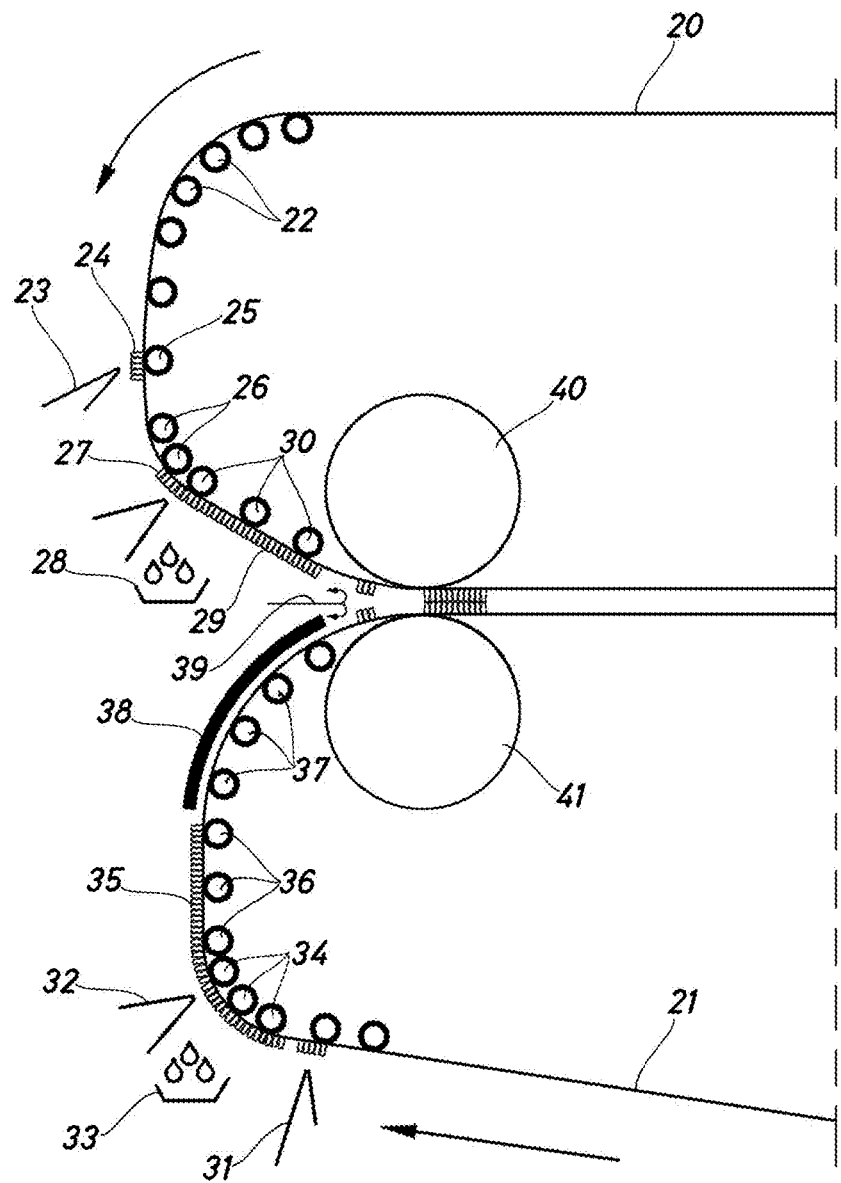
FIG. 2 shows a diagram of the wax input end of the device.

As shown in FIG. 1, the device for producing honeycombs for apiculture according to the present invention comprises a continuous upper strip -20- and a continuous lower strip -21- as disclosed in other inventions by the same inventor, the strips of which carry the cores which face each other and by acting on a mass of wax, will determine the structure of the continuous honeycomb that is the subject to the production method. At the input portion of the device which has been shown in greater detail in FIG. 2, a structure can be seen in which the upper strip -20- differs from the lower strip -21- in the arrangement of magnetic guide rollers, non-magnetic rollers, straight zones and other zones. In detail, on the upper strip -20- a series of magnetic guide rollers -22- is arranged for the upper curvature, after which a scraping device is included shown diagrammatically with the reference numeral -23- for scraping the cores -24- of the upper belt -20-, which corresponds to the arrangement of a magnetic roller -25- for the correct positioning of the belt and of the cores thereof in the scraping phase. Subsequently, other non-magnetic rollers -26- guide the upper strip to a zone where, by means of the curvature of the strip, the cores are opened for injecting wax which is carried out in the zone indicated with reference numeral -27- at high speed and from the bottom upwards. Shown diagrammatically is a tray -28- for collecting the excess wax produced both by the direct injection of the wax in the zone -27- and by the closure of the cores and the ejection of the excess wax which takes place in a straight zone positioned next, indicated by the reference numeral -29- and which is determined by the action of various subsequent magnetic rollers indicated by the reference numeral -30-. In addition, cooling takes place in this zone until the wax achieves a paste-like consistency in order to be able to proceed effectively with the method.

A scraping zone is positioned on the lower strip -21- shown diagrammatically by the reference numeral -31- after which a series of non-magnetic rollers -34- allow the strip to curve for the injection of wax upwards and at high speed, with the injector shown diagrammatically with the reference numeral -32-, means -33- being arranged for collecting the excess wax both from the injection and from the ejection of the excess and partial cooling until a paste-like consistency is achieved, which takes place in the straight zone -35- on which the magnetic rollers -36- act in a similar way as in the upper strip. Next, other non-magnetic rollers -37- allow the strip to curve before entering the honeycomb moulding zone, where the transition to the paste-like state takes place, the temperature being maintained partly by means of a thermal blanket -38- opposite the curved zone determined by the rollers -37-.

Figure 4:
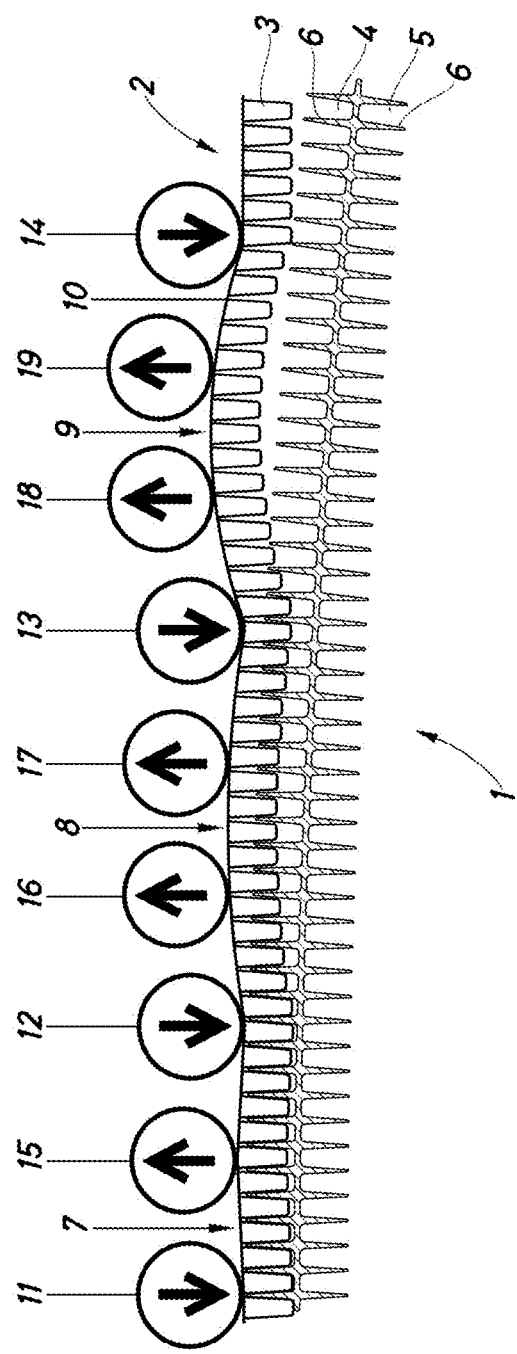
FIG. 4 shows an illustration of the curve of the strip at the output end, due to the action of the magnetic and non-magnetic rollers.

At the input zone of the device where the upper strip and the lower strip meet, a new injection of wax takes place indicated by the reference numeral -39-, the cores of the upper strip and the cores of the lower strip being adapted to each other by the action of the opposing rollers -40- and -41- which act on the upper strip and the lower strip respectively, adapting to each other to form the continuous honeycomb which has been shown in greater detail in FIG. 4.

Figure 3:
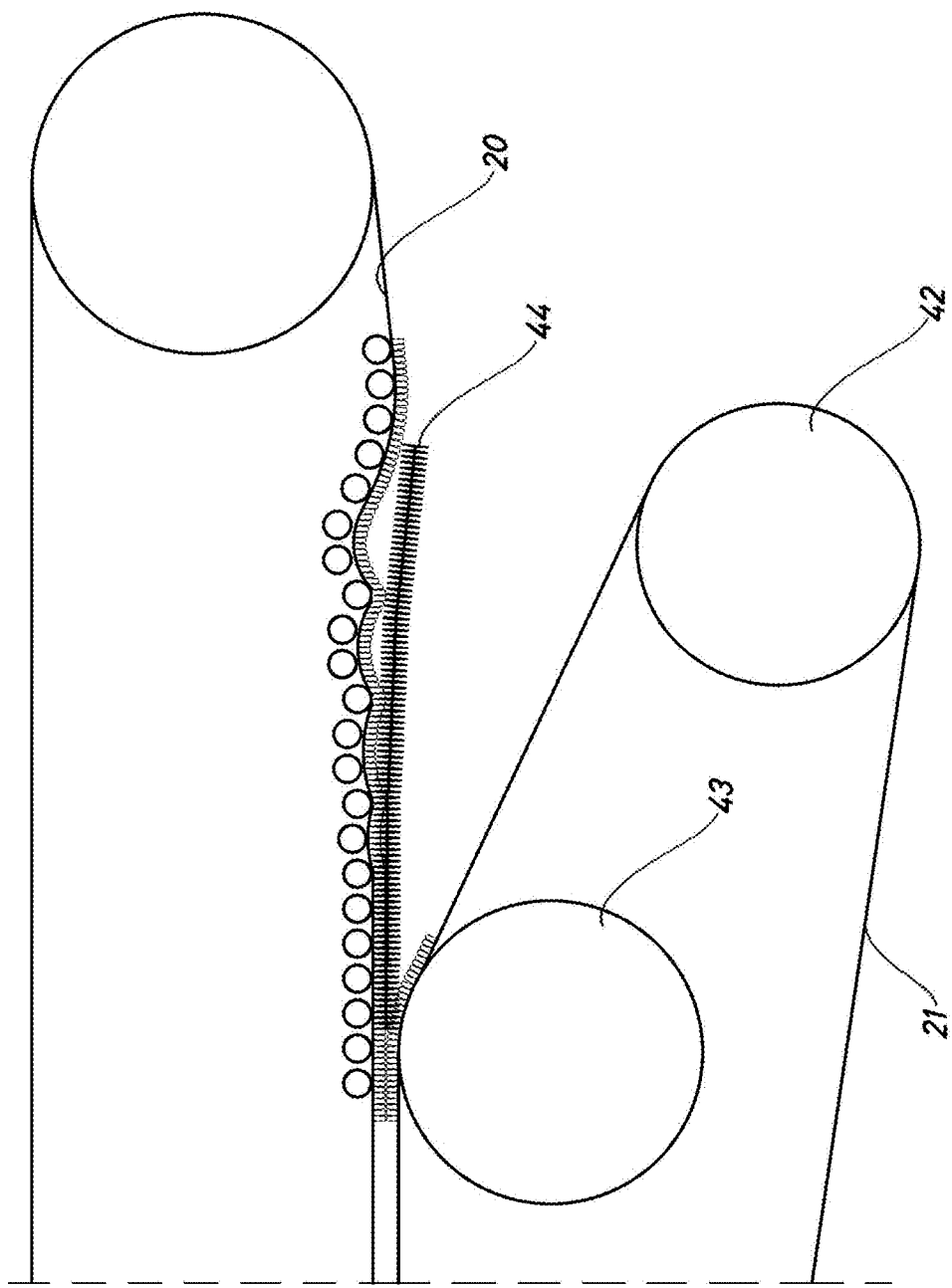
FIG. 3 shows a detail of the output end.

At the output end of the device, as seen in FIGS. 1 and 3, first the lower strip -21- guided by the end drum -42-, is separated receiving the action of the inner roller -43- which guides the strip and is separated from the lower face of the continuous honeycomb -44-. A series of magnetic and non-magnetic upper rollers shown in greater detail in FIG. 3, allow the gradual separation by means of connecting zones of the upper strip -20- with respect to the continuous honeycomb -44-.

An example of the combination of magnetic and non-magnetic rollers to separate the continuous honeycomb gradually from the cores of the upper strip is illustrated at the output end of FIG. 4, and it should be understood that said illustration is simply an example to show the operation provided by the present invention for separating the upper strip of cores from the continuous honeycomb at the output end.

FIG. 4 shows diagrammatically a continuous element -1- from which the individual honeycombs for apiculture will eventually be cut. The final part of the process has been shown in which the element -1- has already solidified and said element -1- must therefore be separated from the upper strip -2- carrying the cores -3- which mould the upper cavities or cells -4- of the element -1-. The lower cavities or cells -5- have already been moulded by a lower strip which is not shown, since it does not intervene for the purpose of the present invention.

The method according to the present invention is based on subjecting the element -1- which has already been moulded with thin walls -6- separating the cells -4-, to a series of successive curvatures or bending operations, so as to be able to separate the moulded element -1- from the cores of the upper strip -3- in a gentle and gradual way so that by the end the upper strip -2- has been completely separated from the continuous moulded element -1-, while keeping the thin walls -6- that separate the various cells intact.

The bending and extension of the various zones will vary, preferably with the bending increasing from the first zone to the last zone where complete extraction of the cores will have taken place.

This has been illustrated in FIG. 4, which shows in a non-limiting embodiment, three successive curved zones -7-, -8- and -9-, which curvature increases from the first zone -7- to the last zone -9-. As will be understood, the number of zones may vary depending on the specific features of the honeycombs to be produced, the composition of the wax, etc.

Figure 5:
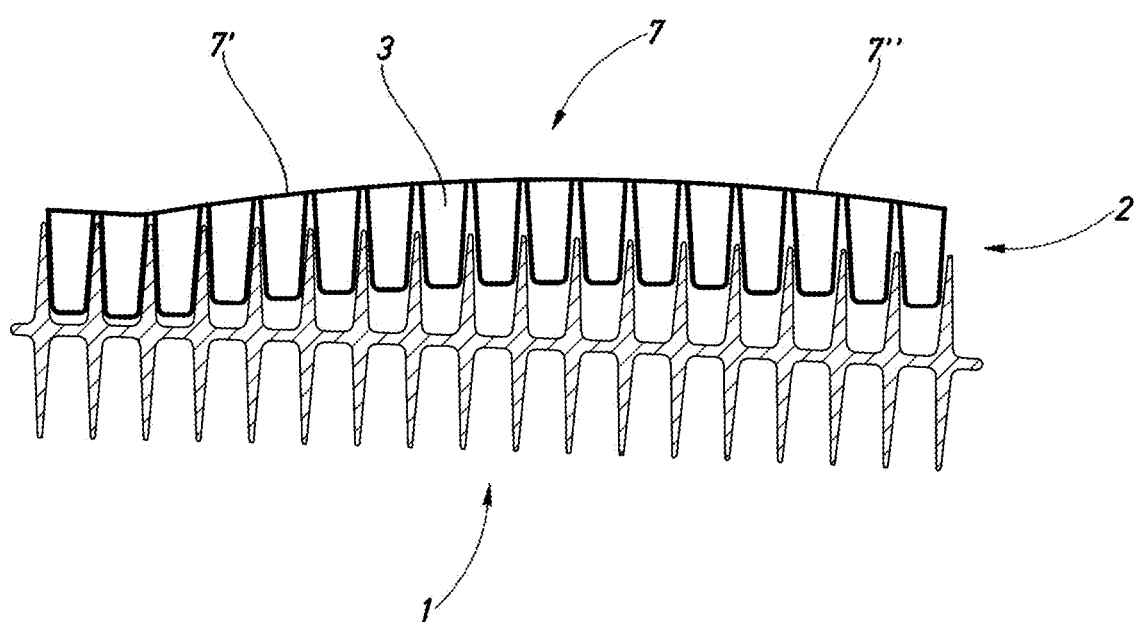
FIG. 5 is a detail of the curve of the rollers of FIG. 4.

The relative position of the moulded element -1- with respect to the upper moulding strip -2- at each of the curved zones is that shown diagrammatically in FIG. 5, in which the zone of curvature -7- has been shown by way of example such that the rising portion -7'- of said curved zone performs the extraction of the moulded element -1- as the cores -3- of the upper strip -2- rise with respect to the element -1-, that is, an initial extraction phase of the moulded element from the upper moulding strip takes place. Next, within the curved portion -7- the second segment -7"-, which forms a descending line, has the effect of expelling the cores -3- from the moulded element -1-.

As shown in FIG. 4, this extraction and ejection effect of each curved zone is repeated at each of the successive curved zones which, in the case shown, are zones -7-, -8- and -9-, but the number and form may vary as required.

As can be seen, the moulded element is separated gradually from the upper moulding strip until at the end of the curved zone -9-, separation is complete and the moulded element -1- can pass to the cutting sector of the individual honeycombs.

The way the successive curved zones are achieved may vary within wide limits, depending on the mechanical means used in each case. In the preferred embodiment, which has been shown, the different curved zones are achieved by series of rollers, some of which are simply guide rollers and others in the intermediate position have permanent magnetism and are therefore able to raise the upper moulding strip -2-, which has a metal strip on its upper face -10-, as the inventor disclosed in other previous inventions as already mentioned.

The arrangement shown as an example in FIG. 4 therefore comprises a series of guide rollers which are variable in number, numbering four in the case shown designated by the reference numerals -11-, -12-, -13- and -14-, separated from each other, depending on the length of the curved zone required for each of the corresponding zones -7-, -8- and -9- and preferably situated at the same height. In the intermediate position between each two guide rollers, permanently magnetised rollers have been arranged, indicated by the reference numerals -15-, -16-, -17-, -18- and -19-. In this example, said rollers are distributed in such a way that the roller -15- is arranged between the rollers -11- and -12- at a slightly greater height to produce the local raising of the upper strip -2- by magnetic attraction of the metal sheet -10-, two magnetic rollers having been arranged in each of the two successive zones of curvature indicated by the reference numerals -16- and -17- for the zone of curvature -8- and -18- and -19- for the zone of curvature -9-. In each case, the magnetic rollers are arranged higher than the adjacent guide rollers in order to determine the separation height of the upper moulding strip, which is a way of determining the curvature of each of the zones owing to the relationship between the separation of the two guide rollers of each zone of curvature with respect to the height reached through the magnetic effect of the permanently magnetised rollers.

As will be understood, the number of successive zones of curvature, the radii of curvature, the number of magnetic rollers in each zone of curvature and other dimensional detail will vary in each specific case.

The extraction phase, which takes place at each of the zones of curvature, is more difficult to carry out due to the contact between the wax of the moulded element and the silicone of the cores, so that air cannot find a way in and the silicone cores must lengthen. The ejection phase is easier because air has entered and the silicone of the cores does not lengthen. For this reason, the first zones of curvature will be shorter and the curvature less, whereas the subsequent zones can be longer and with greater curvature. The change from one to the next is gradual.

The factors to be taken into account in the manufacture are as follows:

The temperature must be low enough for the wax to achieve consistency and not follow the strip. However, the temperature must not be excessively low to avoid breaks when bending.

At the beginning, the friction of the cores is much greater and the undulation must be short so that the wax does not follow the moulding strip, which must be taken into account in respect of the linear separation of the rollers.

The vertical separation of the rollers must be gradual for the same reasons. When the wax of the moulded element is released, the curvature can be much more pronounced in order to eject the moulded wax element. The undulation must increase gradually.

For the rollers to be permanently magnetised, they incorporate permanent magnets in their interior.

Many advantages are achieved through the present invention over prior embodiments of the same inventor, for example:

There is no possibility of contamination, as no iron powder is used.

Electromagnets are not used, as the magnetic rollers can be formed by various neodymium disks, positioned opposite the faces with the same pole in order to direct the field towards the moulding strip with enough strength to produce the undulation.

There is no fragility because the moulding strip does not separate from the rollers, thus avoiding knocks and vibrations.

The method is faster because the silicone cores are released as the moulded element enters the undulating zone, with no rest time.

Consumption is lower, as there are no electromagnetic fields.

There is no need for power electronics.

A basic concept of the invention is the rigidity of the wax and the absence of core/cell coincidence when returning to the rest position. The silicone of the cores lengthens easily when stretched, but is not deformed in compression. When stretched, the silicone cores make extraction easier by becoming thinner, but on compression the cross section increases making it more difficult to recover the initial position, the process resulting in the ejection of the wax.

A preferred embodiment of the present invention has been illustrated and described in the above description. It will be understood however that multiple variants could be introduced by persons skilled in the art without basically changing the features of the invention which is defined by the following claims.

What is claimed is:

1. A device for producing honeycombs for apiculture, the device comprising:
    two parallel continuous strips comprising molding cores, wherein one of the two parallel continuous strips represents an upper strip and the other of the two parallel continuous strips represents a lower strip, the two parallel continuous strips configured to be moveable in opposition for molding a honeycomb from a liquid wax, and wherein the upper strip is longer than the lower strip;
    an inlet at a first end of the device comprising, in succession:
        a scraping zone arranged perpendicular relative to the upper strip, lower strip, or both;
        an opening zone defined by a curvature of the upper and lower strips for receiving an injection of wax; and
        a straight zone for ejection of excess wax and cooling the wax to a paste-like consistency,
    an intermediate region where both strips are arranged in opposition for receiving from the straight zone the wax cooled to a paste-like consistency to mold the honeycomb, and
    an outlet at a second end of the device configured for releasing the molded honeycomb.

2. The device according to claim 1, wherein the inlet further comprises a thermal blanket following the straight zone.

3. The device according to claim 2, wherein the thermal blanket is configured to at least partially envelop the intermediate region in order to regulate a temperature of the intermediate region.

4. The device according to claim 3, wherein the thermal blanket is shaped in order to adopt a curvature of the intermediate region.

5. The device according to claim 1, wherein the two parallel continuous strips comprise a first and a second roller configured to bring the upper and lower strips in opposition in the intermediate region.

6. The device according to claim 1, wherein at the outlet the molding core of the lower strip comprises a third roller configured to bend the lower strip away from the upper strip in order to release the molded honeycomb.

7. A method of producing a continuous honeycomb for apiculture, the method comprising:
providing a device according to claim 1,
injecting wax in the opening zone,
ejecting excess wax and cooling the wax to a paste-like consistency in the straight zone,
molding the honeycomb from the wax cooled to a paste-like consistency in the intermediate region where both strips are arranged in opposition for receiving from the straight zone to mold the honeycomb, and
releasing the molded honeycomb at the outlet in a controlled manner.

8. The method according to claim 7, further comprising separating the released continuous honeycomb into multiple successive separate pieces.

9. The method according to claim 7, wherein the continuous molded honeycomb is subjected to an initial step of partial separation from the upper strip prior to being released at the outlet.

10. The method according to claim 8, further comprising in the intermediate region and the outlet a plurality of adjacently placed magnetic and non-magnetic guide rollers on the side of the upper strip opposite the side facing the lower strip, wherein the upper strip further comprises successive zones of curvature each zone of curvature being defined by at least one magnetic guide roller placed at a level that is higher than the level of the adjacent guide rollers, each zone of curvature being generated by magnetic attraction of the upper strip towards the magnetic roller placed at a level that is higher than the level of the adjacent guide rollers.

11. The method according to claim 10, wherein the height of the magnetised rollers of each zone of curvature is variable depending on the radius of curvature required to be reached in the corresponding zone in combination with the separation of the adjacent guide rollers wherein the level of the at least one magnetic guide roller is directly related to an extent of curvature of each zone of curvature.

* * * * *